US006916016B2

(12) United States Patent
Akasa

(10) Patent No.: US 6,916,016 B2
(45) Date of Patent: Jul. 12, 2005

(54) FLUID-FILLED VIBRATION DAMPING DEVICE AND METHOD OF MANUFACTURING THE SAME

(75) Inventor: Syouji Akasa, Ichinomiya (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 0 days.

(21) Appl. No.: 10/428,913

(22) Filed: May 2, 2003

(65) Prior Publication Data

US 2003/0214086 A1 Nov. 20, 2003

(30) Foreign Application Priority Data

May 7, 2002 (JP) ........................................ 2002-132191

(51) Int. Cl.[7] .............................................. F16M 9/00
(52) U.S. Cl. ............................................... 267/140.13
(58) Field of Search .................. 267/140.11, 140.13, 267/140.14, 140.15, 140.2, 141.1–141.5, 219; 29/896.93, 896.9, 896.91

(56) References Cited

U.S. PATENT DOCUMENTS 6,250,615 B1 * 6/2001 Leibach ................. 267/140.13

6,523,813 B1 * 2/2003 Kato ..................... 267/140.11

FOREIGN PATENT DOCUMENTS

| JP | 61-189341 | 8/1986 |
| JP | 5-71490 | 9/1993 |
| JP | 7-167200 | 7/1995 |

* cited by examiner

Primary Examiner—Xuan Lan Nguyen
(74) Attorney, Agent, or Firm—Beyer Weaver & Thomas, LLP

(57) ABSTRACT

Disclosed is a fluid-filled vibration-damping device and a method of manufacturing the same, wherein an elastic body connecting a first and second mounting members partially defines a fluid-filled zone filled with non-compressible fluid, and a sealing part of the fluid-filled zone is formed by forcedly fitting an annular fixing projection formed on one of an inner circumferential surface of a first sealing member or an outer circumferential surface of a second mounting member into an annular fixing recess formed onto the other. Drain passages are formed at an interface between the annular fixing recess and projection to expose a floor of the annular fixing recess to an outside. Compressed air is blown into one of the drain passages so as to blow away or forcedly discharge the non-compressible fluid remained on the floor of the annular fixing recess to the outside through another drain passage.

28 Claims, 6 Drawing Sheets

FLUID-FILLED VIBRATION DAMPING DEVICE AND METHOD OF MANUFACTURING THE SAME

INCORPORATED BY REFERENCE

The disclosure of Japanese Patent Application No. 2002-132191 filed on May 7, 2002 including the specification, drawings and abstract is incorporated herein by reference in its entirety.

BACKGROUND OF THE INVENTION

1. Field of the Invention

The present invention relates generally to fluid-filled vibration-damping devices usable for engine mounts, body mounts, differential mounts and other mounts for automotive vehicles. More particularly, the present invention is concerned with novel manufacturing method and structure of a fluid-filled vibration-damping device capable of damping vibrations based on flows of non-compressible fluid sealed therein, or alternatively through a suitable control of pressure in the sealed fluid.

2. Description of the Related Art

A fluid-filled vibration-damping device is known as one type of vibration-damping device interposed between two components of a vibration system. The fluid-filled vibration-damping device includes: a first mounting member fixable to one of the two components; a second mounting member fixable to the other of the two components; a rubber elastic body elastically connecting the first and second mounting members while defining partially a fluid-filled zone in which non-compressible fluid is sealed. Such a known fluid-filled vibration-damping device is able to exhibit high vibration damping effect based on flows of non-compressible fluid or pressure control of the fluid, so that the known fluid-filled vibration-damping device has been expected to be used as an engine mount or other mounts for automotive vehicles.

Generally, such a fluid-filled vibration-damping device needs to provide high fluid-tight sealing at the fluid-filled zone after filling the fluid-filled zone with non-compressible fluid, to eliminate the likelihood of deterioration of an intended damping effect as a result of leakage of the non-compressible fluid from the fluid-filled zone.

A variety of sealing structures has been proposed in order to establish satisfactory fluid-tight sealing at the fluid-filled zone while facilitating filling of the fluid-filled zone with non-compressible fluid. According to one of the known sealing structures, a sealing part of the fluid-filled zone is at least partially configured such that a first sealing member of cylindrical configuration is fitted externally about and firmly assembled with a second sealing member with an annular fixing projection formed at one of the first and second sealing members being fluid-tightly, firmly fitted into a circumferential groove formed onto an inner or outer circumferential surface of the other of the first and second sealing members. Accordingly, the first and second sealing member is firmly fixed together with fluid-tightness.

More specifically, JP-A-61-189341 or JP-U-5-71490 disclose an example of the sealing structure as described above, wherein one of the two sealing members is constituted by a second mounting member of hollow cylindrical configuration whose opening at one axial end thereof is closed by the elastic body, and the other of the two sealing members is constituted by a cover member of shallow bottomed cylindrical shape. The cover member is situated on the side of the other axial end of the second mounting member such that open ends of the cover member and the second mounting member are butted together and caulked against to each other with a peripheral portion of a thin rubber layer interposed therebetween. Therefore, the other opening of the second mounting member is closed by the thin rubber layer, thereby providing the sealing structure illustrated above. Described in detail, a flange is formed at one of the open ends of the cover member and the second mounting member, while a caulking part is formed at the other open end so as to grip a periphery of the flange portion. The caulking part provides an annular fixing recess, and the flange portion provides an annular fixing projection, so that the flange portion is forcedly fitted into the flange portion, thereby accomplishing the above-described sealing structure in which the two sealing members are firmly fixed together with fluid-tightness.

Another example of the known sealing structure is disclosed in Japanese Patent Application No. 2001-215551 filed by the present assignee, in which one of the two sealing members is constituted by the second mounting member of hollow cylindrical configuration having an annular fixing projection formed at one open end peripheral portion thereof so as to protrudes radially inwardly, while the other of the two sealing members is constituted by a block shaped partition member having an annular fixing recess open in an outer circumferential surface thereof. The second mounting member is fitted externally about the partition member with its annular fixing projection firmly fitted into and held in engagement with the annular fixing recess of the partition member, with fluid-tightness.

In the known sealing structure as disclosed in JP-A-61-189341, JP-U-5-71490 and Japanese Patent Application No. 2001-215551, the two sealing members are fluid-tightly assembled together by axially inserting one of the two members into or onto the other, by utilizing a firmly fitting engagement of the annular fixing projection with the recess, thereby establishing advantageously desired fluid-tight sealing at the sealing part between the two sealing members. However, the known sealing structure has been prone to cause that on-compressible fluid has been sealed as residual liquid in the sealing part of the fluid-filled zone, in the course of assembly of components of the fluid-filled vibration-damping device within a mass of the non-compressible fluid, or during washing the device by means of a high-pressure liquid. If an obtained product contains residual liquid in the sealing part, the residual liquid may possibly leak out due to a change in ambient temperature and/or vibrations applied to the fluid-filled vibration-damping device. In this case, considerably difficult is a judgment as to whether the leakage of the fluid is due to an actual leakage of the non-compressible fluid from the fluid-filled zone or due to the leakage of the residual liquid in the sealing part. Therefore, a so-called "false leakage" of the fluid caused by the residual liquid leakage from the sealing part may give rise to anxiety about leakage of the sealed fluid from the fluid-filled zone, although the fluid-tight sealing at the fluid-sealing zone is kept at a desired level in actual.

To cope with the problem of the residual liquid as discussed above, one modified fluid-filled vibration-damping device has been proposed in JP-A-7-167200. In this modified device, a sealing part of a fluid-filled zone consists of a flange portion of a cover member and a caulking part formed at one open end peripheral portion of a second mounting member, which is caulked against to the flange portion, like in the above mentioned conventional devices. An improvement of the modified device is that the flange portion is provided with a groove so that the residual liquid remained in the sealing part effectively flows to the outside through the groove.

In this regards, a relatively small groove makes it difficult for the residual liquid to flow to the outside through the groove due to intermolecular forces, a gap vacuum, or the like. For this reason, the groove formed in the flange portion needs to have a relatively large size enough to establish a good discharge of the residual liquid through the groove. However, the larger the groove size, the greater the deterioration in fluid-tight sealing at the sealing part or in strength of the members. Accordingly, the modified fluid-filled vibration-damping device as proposed in JP-A-7-167200 has not yet been practical in mechanism of discharging residual liquid.

SUMMARY OF THE INVENTION

It is therefore one object of this invention to provide a novel manufacturing method and structure of a fluid-filled vibration damping device permitting fast and effective discharge of residual liquid remained in a sealing part of a fluid-filled zone formed therein.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to those modes of the invention and combinations of the elements or technical features, but may otherwise be recognized based on the teachings of the present invention disclosed in the entire specification and drawings or that may be recognized by those skilled in the art in the light of the present disclosure in its entirety.

A first aspect of the invention provides a novel manufacturing method of a fluid-filled vibration-damping device. There will be described presently preferred mode of the first aspect of the invention: (1) A method of manufacturing a fluid-filled vibration-damping device comprising the steps of: connecting a first mounting member and a second mounting member via an elastic body; providing a fluid-filled zone partially defined by the elastic body and filled with non-compressible fluid; preparing at least one sealing part of the fluid-filled zone by fitting externally a first sealing member of cylindrical configuration about a second sealing member, and by fluid-tightly fixed the first and second sealing member to each other by fitting a first annular fixing projection formed on one of an inner circumferential surface of the first sealing member and an outer circumferential surface of the second mounting member into a first annular fixing recess formed onto an other one of the inner circumferential surface of the first sealing member and the outer circumferential surface of the second mounting member; forming a plurality of drain passages at respective circumferential locations on an interface between the first annular fixing recess and projections in order to expose a floor of the first annular fixing recess to an outside; and blowing compressed air in through at least one of the plurality of drain passages so as to forcedly discharge the non-compressible fluid remained on the floor of the first annular fixing recess to the outside.

This mode of the first aspect of the invention makes it possible to establish a desired high fluid-tight sealing at the sealing part of the fluid-filled zone. Additionally, in the case where non-compressible fluid or the like remains in the sealing part, the present method permits an fast and efficient elimination of the residual liquid in the sealing part by blowing the compressed air in through one or more of the drain passages and forcedly pushing out the residual liquid from the sealing part. This method is advantageous in eliminating the conventional problem of "false leakage", thereby facilitating checking operation performed on obtained products in terms of fluid-tight sealing, and thereby improving reliability of the obtained products.

According to the manufacturing method of this mode, compressed air is brown in through one or more of the drain passage(s) into a gap defined by and between a floor of the first annular fixing recess and a top face of the first annular fixing projections in which non-compressible fluid has been sealed as residual liquid. As a result, compressed air is forced to flow through the gap and discharged from another or other drain passage(s), thereby providing an airflow passage connecting between drain passages via the gap. The presence of the airflow passage makes it possible to forcedly discharge a residual liquid remained in the gap from the drain passages, thus permitting efficient and fast discharge of the fluid remained in the sealing part.

Additionally, the use of compressed air allows forced discharge of the residual liquid or the like remained in the sealing part, making it possible to sufficiently minimize the drain passages in cross section while ensuring satisfactory discharge efficiency of the residual liquid. Thus, the conventionally experienced problems due to enlargement of the drain passages or insufficient strength of components and deterioration in fluid-tight sealing at the sealing part, can be expelled in efficient manner.

Conventionally, in manufacture of fluid-filled vibration damping devices, a process for assembling components within a mass of non-compressible fluid has been employed to form a fluid-filled zone while at the same time filling and sealing the non-compressible fluid in the fluid-filled zone. Therefore, existing production lines for manufacturing fluid-filled vibration-damping devices have been generally arranged and equipped with suitable devices for performing processes for washing the non-compressible fluid, e.g., alkylene glycol, off the surface of an obtained product and blowing compressed air on the surface of the product for drying the non-compressible fluid on the surface. The manufacturing method of the present mode can be performed by effectively utilizing such air blowing system and devices, which have been already equipped in the lines, with a minimal design change and without needing considerable supplement in equipments and additional processes to be executed. Therefore, the present method can exhibit an extremely high serviceability.

The method of this mode of the invention can be applicable in manufacturing fluid-filled vibration-damping devices, which are disclosed in Japanese Patent application No. 2001-215551, JP-A-61-189341, JP-U-5-71490 and JP-A-7-167200, for example. Further, the fluid drain passages can be configured in a variety of forms, but not limited to a specific configuration. For instance, the drain passages for connecting the gap to the outside can be advantageously formed by utilizing grooves, cutouts or through holes formed on the first and/or the second sealing members.

(2) A method of manufacturing a fluid-filled vibration-damping device comprising the steps of: connecting a first mounting member and a second mounting member via an elastic body; providing a fluid-filled zone partially defined by the elastic body and filled with non-compressible fluid; preparing at least one sealing part of the fluid-filled zone by fitting externally a first sealing member of cylindrical configuration about a second sealing member, and by fluid-tightly fixed the first and second sealing member to each other by fitting a first annular fixing projection formed on one of an inner circumferential surface of the first sealing member and an outer circumferential surface of the second mounting member into a first annular fixing recess formed onto an other one of the inner circumferential surface of the first sealing member and the outer circumferential surface of the second mounting member; forming a plurality of drain passages at respective circumferential locations on an interface between the first annular fixing recess and projections in order to expose a floor of the first annular fixing recess to an outside; and after filling and sealing the fluid-filled zone with the non-compressible fluid, placing the device in a vacuum vessel so as to forcedly discharge the non-compressible fluid remained in the floor of the first annular fixing recess to the outside.

According to the manufacturing method of this mode, vacuum air is exerted on the sealing part through the drain passages, thereby forcedly discharging residual liquid in the sealing part. Like the above mode (1), the manufacturing method of this mode permits fast and efficient removal of the residual liquid in the sealing part in a process of the manufacture, thereby eliminating the problem of "false leakage", and effectively improving reliability on a fluid-filled vibration-damping device produced according to the method of this mode. Further, a negative pressure filling the vacuum vessel can be effectively exerted on the floor of the first annular fixing recess, even if the drain passages are made small in cross section. Therefore, the method of this mode makes it possible to efficiently and rapidly discharge liquid remained in the sealing part without deteriorating strength in components and fluid-tight sealing at the fluid-filled zone, like in the method of the above mode (1). Yet further, the method of this mode of the invention can be applicable for manufacturing fluid-filled vibration-damping devices, which are disclosed for example in Japanese Patent application No. 2001-215551, JP-A-61-189341, JP-U-5-71490 and JP-A-7-167200, like the method of the above mode (1).

(3) A method of manufacturing a fluid-filled vibration-damping device according to the above-indicated mode (1) or (2), further comprising the steps of: arranging the first annular fixing recess of one of the first and second sealing members to have lateral sidewalls having different heights; and when fitting the first sealing member externally about the second sealing member, positioning the first and second sealing members relative to each other in a direction in which the first sealing member is inserted onto the second sealing member by means of an abutting contact of one of axially opposite ends of the other of the first and second sealing members with a higher one of the lateral sidewalls. According to the manufacturing method of this mode, the first sealing member, when inserted onto the second sealing member, can be easily and precisely positioned relative to the second sealing member in the direction of its insertion so that the first annular fixing projection comes into fitting engagement with the first annular fixing recess. This method can facilitate further manufacture of the fluid-filled vibration damping device as well as assembly of the first and second sealing members.

(4) A method of manufacturing a fluid-filled vibration-damping device according to any one of the above-indicated modes (1)–(3), further comprising the steps of: arranging the first annular fixing recess of one of the first and second sealing members to have lateral sidewalls one of which includes a thin-walled portion at least one circumferential position thereof, and forming a plurality of notches in the thin-walled portion so as to provide the drain passages. This method makes it possible to form efficiently the drain passages connectable to the floor of the first annular fixing recess with a relatively small length, further facilitating discharge of the residual liquid from the floor of the first annular fixing recess.

(5) A method of manufacturing a fluid-filled vibration-damping device according any one of the above modes (1)–(4), further comprising the steps of: bending radially inwardly one of axially opposite end portions of the first sealing member to form the first annular fixing projection; shaping the second sealing member a block-like member having an cylindrical outer circumferential surface; forming the first annular fixing recess onto the outer circumferential surface of the second sealing member; and after disposing the first sealing member on the second sealing member, performing a diameter reducing process on the first sealing member to press-fitting the first annular fixing projection into the first annular fixing recess so that the first and second sealing member fixedly assembled together. According to this method of this mode, the first annular fixing recess is open in the outer circumferential surface of the second sealing member, making it easy to press fitting the first annular fixing projection to the first annular fixing recess by radially inwardly drawing the first sealing member through the diameter reducing process. In particular, the drain passages can be formed to be open in the outer circumferential surface of the second sealing member, making it easy to blow the compressed air in through one or more of the drain passages in order to discharge the residual liquid remained in the sealing part from another or other drain passage(s), thus ensuring efficient discharge of the residual liquid by means of compressed air blowing.

(6) A method of manufacturing a fluid-filled vibration-damping device according to any one of the above-indicated modes (1)–(5), further comprising the step of fitting the first sealing member externally about the second sealing member within a mass of the non-compressible fluid. In this method, the first sealing member is disposed radially outwardly on and secured fitted onto the second sealing member, while at the same time filling and sealing non-compressible fluid in the fluid-filled zone with a fluid-tight sealing at the sealing part. Generally, when employing the step of assembly of the first and second sealing members within the mass of the non-compressible fluid, a drying step is also employed in which a compressed air blowing onto the surface of an obtained assembly, in order to wash and dry a surface of an assembly taken out from the mass of the non-compressible fluid. By advantageously utilizing and introducing the compressed air into the drain passages, the residual liquid in the sealing part can be pushed out through the drain passages, without needing any special equipments or steps.

A second aspect of the invention provides a fluid-filled vibration-damping device of novel structure. There will be described presently preferred mode of the second aspect of the invention: (7) A fluid-filled vibration-damping device comprising: a first mounting member; a second mounting member; an elastic body elastically connecting the first and second mounting members; a fluid-filled zone partially defined by the elastic body and filled with non-compressible fluid; a first sealing member and a second sealing member which cooperate to constitute at least one sealing part of the fluid-filled zone, the first sealing member being of cylindrical configuration, having a first annular fixing projection formed by bending radially inwardly one of axially opposite end portions thereof, and being fitted into a first annular fixing recess formed onto an outer circumferential surface of the second sealing member so that the first and second sealing members are fluid-tightly fixed together; and a plurality of drain passages formed at respective circumferential locations on an interface between the first annular fixing recess and projections and open in an outer circumferential surface of the device in order to expose a floor of the first annular fixing recess to an outside, wherein the non-compressible fluid remained on a floor of the first annular fixing recess is able to be forcedly discharged to the outside through the drain passages by means of compressed air brown in through at least one of the drain passages.

In the fluid-filled vibration-damping device constructed according to this mode of the second aspect of the invention, the presence of the drain passage open in the outer circumferential surface of the device makes it easy with efficiency to deliver the compressed air to the floor of the first annular fixing recess of the sealing part therethrough, even if the non-compressible fluid or the like is remained in the sealing part of the fluid-filled zone. That is, the compressed air blown in through one or more of the drain passages is discharged out from another or other drain passage(s) via the first annular fixing recess functioning as a passage, while pushing out along therewith the residual liquid or the like remained in the first annular fixing recess together in an efficient and prompt manner. As a result, the conventionally experienced problem of false leakage caused by the residual liquid in the sealing part can be effectively eliminated. In this respect, the drain passages may have a variety of structures, but not limited specifically. For instance, the drain passages may be formed by utilizing grooves, cutouts, through holes and the like provided on one or both of the first and second sealing members, so as to extend from the outer surface of the device to the interface between the first annular fixing recess and projections.

(8) A fluid-filled vibration-damping device according to the above-indicated mode (7), wherein the plurality of drain passages comprises two drain passages formed at two circumferential locations diametrically opposed to each other. In this arrangement, the compressed air blown in through one of the two drain passages can be discharged out from the other drain passages through the overall first annular fixing recess in the sealing part, together with the residual liquid and the like, thus eliminating the residual liquid in a considerably efficient manner. Also, the number of drain passages can be made minimal, hardly causing deterioration in strength and flight-tightness between the first and second sealing members at the sealing zone.

(9) A fluid-filled vibration-damping device according to the above-indicated mode (7) or (8), wherein the first sealing member is constituted by the second mounting member of cylindrical configuration, the second mounting member being opposed at one axial open-end portion thereof to the first mounting member with a spacing therebetween so that the one axial open-end portion of the second mounting member is fluid-tightly closed by the elastic body connecting the first and second mounting members, and at an other axial open-end portion thereof to be bent radially inwardly to provide the first annular fixing projection, wherein the second sealing member is constituted by a block like partition member made of rigid material such as metal and synthetic resin and having a cylindrical outer circumferential surface, and the first annular fixing recess is formed onto an outer circumferential surface of the partition member, and wherein the other axial open-end portion of the second mounting member is fitted externally about the partition member on one axial side of the partition member, and the first annular fixing projection formed on the other side of the second mounting member is press-fitted into the first annular fixing recess open in the outer circumferential surface of the partition member so that the elastic body and the partition member cooperate to form therebetween a pressure-receiving chamber providing the fluid-filled zone. In the fluid-filled vibration-damping device according to this mode of the invention, the first and second sealing members mutually assembled are constituted by the second mounting member and the partition member, respectively, thus reducing the number of components cooperating to provide the sealing zone. Additionally, the first annular fixing projection formed at the other open-end portion of the second mounting member can be positioned relative to the first annular fixing recess formed onto the partition member, and forcedly fitted into the annular fixing recess by simply performing the diameter reducing process on the second mounting member. This makes it easy to form the sealing part in comparison with the conventional way where the sealing part is formed by caulking.

(10) A fluid-filled vibration-damping device according to the above-indicated mode (9), further comprising a cylindrical support member and a flexible rubber layer bonded at an outer circumferential portion thereof to an inner circumferential surface of the cylindrical support member so as to fluid-tightly close one axial open end of the cylindrical support member, wherein a second annular fixing projection is formed at an other axial open end of the cylindrical support member, and a second annular fixing recess is formed onto the outer circumferential surface of the partition member to be independent of and parallel to the first annular fixing recess to be engaged with the first annular fixing projection of the second mounting member, and wherein the cylindrical support member is fitted externally about the partition member on an other axial side of the partition member, and the second annular fixing projection formed at the cylindrical support member is press fitted into the second annular fixing recess open in the outer circumferential surface of the partition member so that the flexible rubber layer and the partition member cooperate to form therebetween an equilibrium chamber providing the fluid-filled zone. In the fluid-filled vibration-damping device of this mode, the one partition member is assembled at its both axial ends with the second mounting member and the cylindrical support member, which are disposed radially outwardly on and firmly fixed to the partition member by means of firmly fitted engagement between the first annular fixing projections formed at the second mounting member and the cylindrical support member with the first and second annular fixing recesses open in the outer circumferential surface of the partition member at both axial ends. Therefore, the pressure-receiving chamber and the equilibrium chamber, which are cooperate to form the fluid-filled zone, can be efficiently formed on the both axial sides of the partition member with simple structure, while effectively avoiding the problem of false leakage of the non-compressible fluid at two sealing parts located at both axial ends of the partition member.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
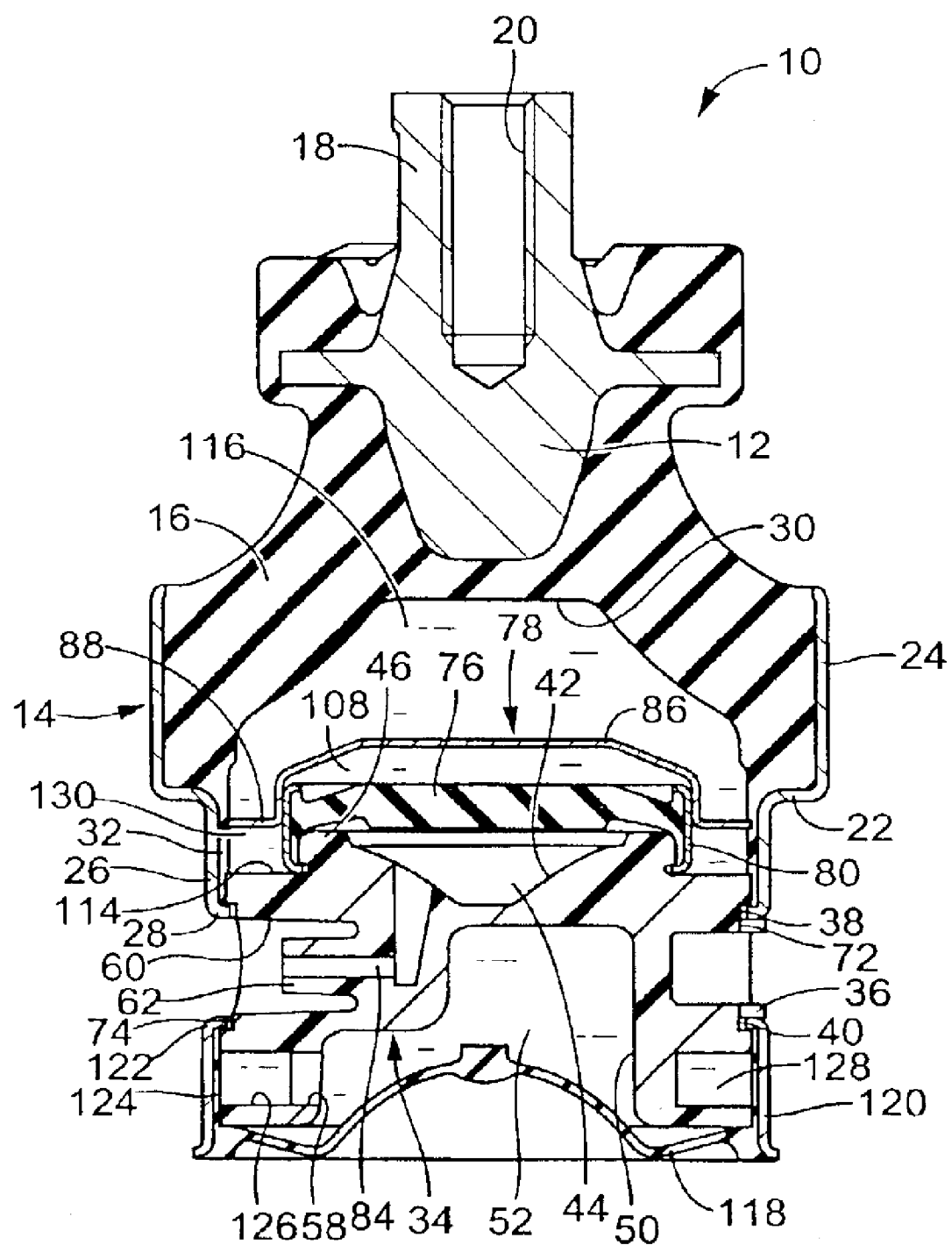
FIG. 1 is an elevational view in axial or vertical cross section of a fluid-filled vibration-damping device in the form of an engine mount for use in automotive vehicle, which is constructed according to one preferred embodiment of the invention.
Figure 2:
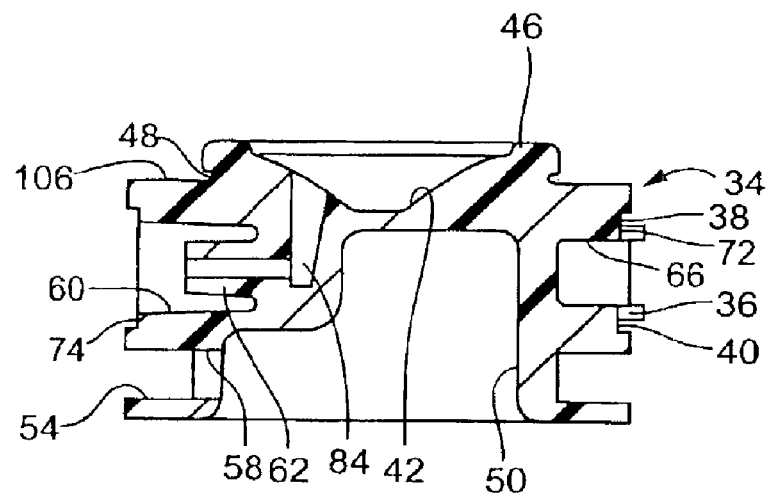
FIG. 2 is an elevational view in axial or vertical cross section of a partition member of the engine mount of FIG. 1.
Figure 3:
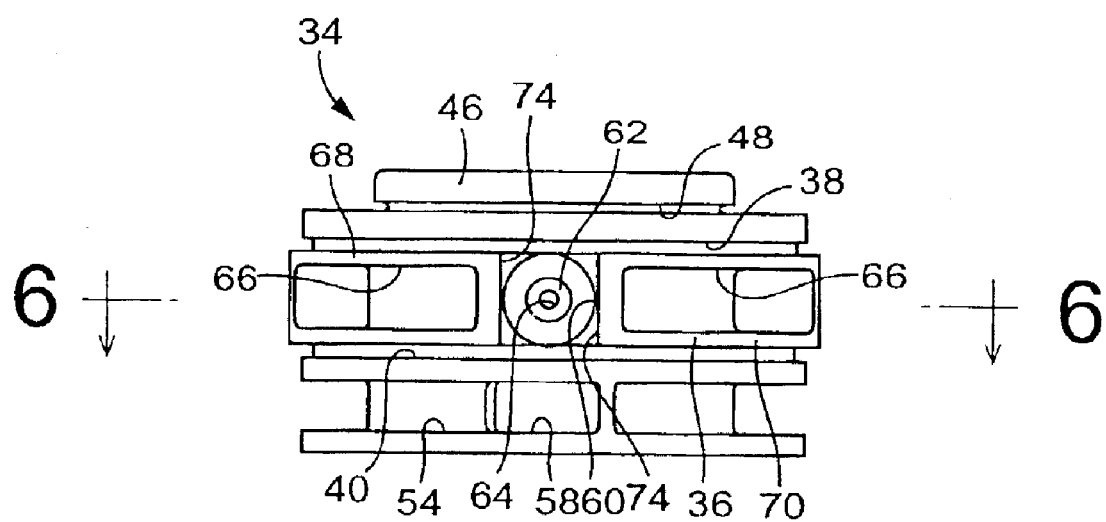
FIG. 3 is a left-side elevational view of the partition member of FIG. 2.
Figure 4:
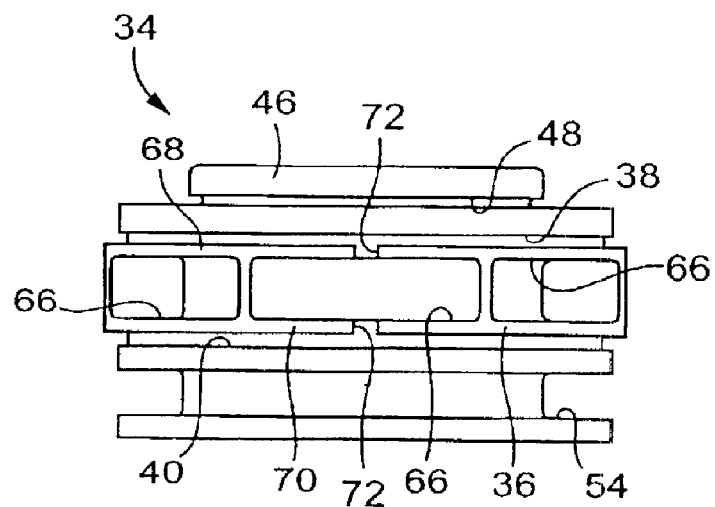
FIG. 4 is a right-side elevational view of the partition member of FIG. 2.
Figure 5:
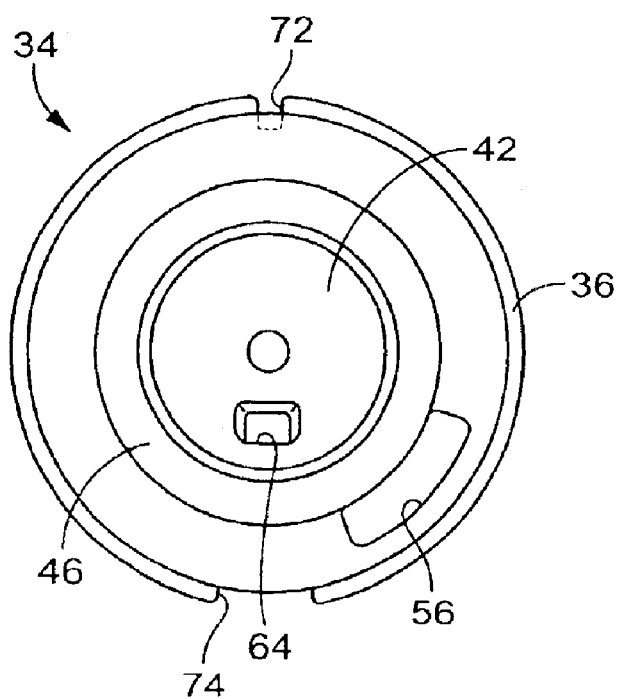
FIG. 5 is a top plane view of the partition member of FIG. 3.
Figure 6:
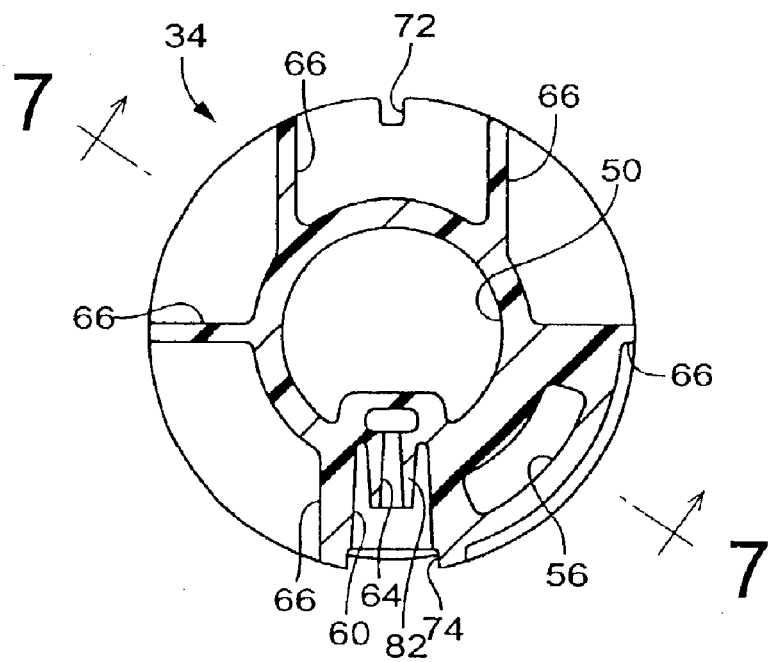
FIG. 6 is a cross sectional view taken along line 6—6 of FIG. 3.

Referring first to FIG. 1, shown in a fluid-filled vibration-damping device in the form of an engine mount 10 for use in automotive vehicles, which is constructed according to the present invention. The engine mount 10 has a structure wherein a first mounting member 12 and a second mounting member 14, which are made of metal, are disposed some distance apart and elastically connected together by means of an elastic body made of rubber. This engine mount 10 may be installed on a vehicle such that the first mounting member 12 is attached to a power unit side of the vehicle and the second mounting member 14 is attached to a body side of the vehicle, for thereby supporting the power unit on the body in a vibration damping fashion. In the following description, the vertical direction is basically oriented in the vertical direction as seen in FIG. 1.

Described in detail, the first mounting member 12 approximates an inverted frustoconical shape, having a nut portion projects axially upwardly integrally formed at its large-diameter end portion. The first mounting member 12 is fixable to the power unit by means of a bolt (not shown) threaded into a screw hole 20 in the nut portion 18.

The second mounting member 14, on the other hand, is configured as a first sealing member having an overall shape of a large-diameter, stepped round cylinder, wherein a shoulder portion 22 situated its axially intermediate section is disposed between a large-diameter portion 24 situated axially thereabove, and a small-diameter portion 26 situated axially therebelow. At an open end portion situated on the small-diameter portion 26 of the second mounting member 14, integrally formed is a first annular fixing projection in the form of an engaging projection d radially inwardly and projecting a slight distance in a radially inward direction, while having a continuous annular shape around the circumference of second mounting member 14. The second mounting member 14 can be manufactured by pressing, which affords the advantage of being able to form the engaging projection 28 fairly easily. Specifically, after drawing a blank into a bottomed round cylinder shape of predetermined axial length, the center portion of the bottom can be punched to form the engaging projection 28. The second mounting member 14 is then press-fitted into a tubular bracket made of metal (not shown), and mounted to the body via the bracket.

The first mounting member 12 is disposed coaxially with but spaced some distance away from the large-diameter portion 24 of the second mounting member, with the first mounting member 12 and the second mounting member 14 being elastically connected with each other via the elastic body 16.

The elastic body 16 is of large-diameter, approximately frustoconical shape with an approximately cone-shaped recess 30 formed on its large-diameter end portion and open in a central portion of its large-diameter end face. In the process of vulcanization of a rubber material for forming the elastic body 16, the first mounting member 12 is inserted into and axially and bonded to the small-diameter end portion of the elastic body 16, and an inner circumferential surface of the large-diameter portion 24 of the second mounting member 14 is bonded onto an outer circumferential surface of the large-diameter end portion of the elastic body 16, whereby the opening at the large-diameter portion of the second mounting member 14 is sealed in a fluid-tight fashion by means of the elastic body 16. A sealing rubber layer 32 integrally formed with the elastic body 16 is bonded through a rubber vulcanization process to an inner circumferential surface of the small-diameter portion 26 of the second mounting member so as to coat the approximately entire surface thereof. As will be readily apparent from the above description, the elastic body 16 in the present embodiment forms an integral vulcanized product incorporating the first and second mounting members 12, 14.

As a second sealing member, a partition member 34 is provided to the opening at the small-diameter portion 26 of the second mounting member 14. As shown in FIGS. 2–6, the partition member 34 has an overall round block shape formed of a rigid material such as hard synthetic resin or metal. On the outer circumferential surface of the partition member 34, integrally formed is an annular projection 36, which projects out a minimal distance radially outwardly from the outer circumferential surface at an axially intermediate location of the partition member 34. The annular projection 36 extends continuously over an entire circumference of the partition member 34 with a substantially constant width dimension in the axial direction of the partition member 34. With the annular projection 36 situated axially therebetween, there are formed above and below in a first circumferential groove constituting a first annular fixing recess, and a second circumferential groove 40 constituting a second annular fixing recess. The first and second circumferential grooves 38, 40 are open in an outer circumferential surface of the partition member 34 in its axially intermediate section, and extend parallel to each other. Each of the first and second circumferential grooves 38, 40 extends continuously circumferentially over an entire circumference of the partition member 34 with an approximately constant width dimension.

The partition member 34 has an upper recess 42 open in a central portion of an axially upper end face thereof. The upper recess 42 has an approximately mortar shape opening upwardly, and is useful in ensuring a sufficient capacity of a working air chamber 44, which will be described later. The peripheral edge of the opening of the upper recess 42 projects upwardly, whereby the upper end face of the partition member 34 has an annular support projection 46 projecting upwardly and integrally formed thereon. At the basal end of the support projection 46 is formed an engaging groove in an outer circumferential surface of the support projection 46 and extending circumferentially continuously over an entire circumference of the support projection 46 with a substantially constant width dimension. On an axially lower end face of the partition member 34 is formed a lower recess 50 of approximately conical shape. The lower recess 50 is open in a central portion of the axially lower end face of the partition member 34 and is useful in ensuring a sufficient capacity of an equilibrium chamber 52, which will be described later.

The partition member 34 includes an outer circumferential groove 54 open in its outer circumferential surface at a location situated axially below the second circumferential groove 40, and extending circumferentially over a given circumferential length (which is made slightly less than the entire circumference of the partition member 34 in the present embodiment). The partition member 34 further includes a first through hole 56 extending axially and a second through hole 58 extending diametrically through a circumferential wall of the lower recess 50 formed therein. Via the first through hole 56, one of circumferentially opposite ends of the outer circumferential groove 54 is open on the outer circumferential side of the annular support projection 46 in the axially upper end face of the partition member 34. Via the second through hole 58, on the other hand, the other end of the outer circumferential groove 54 is open to the lower recess 50 of the partition member 34.

The annular projection 36 of the partition member 34 has a circular housing recess 60 open in its outer circumferential surface at one circumferential location. The housing recess 60 houses therein a port 62 projecting up from its floor such that the port 62 does not project out beyond the housing recess 60. A passage 64 formed in the port 62 deflects axially upward to pass through the partition member 34 to be open in a tapered face of the upper recess 42.

The annular projection 36 further includes a plurality of pocket-shaped lightening recesses 66 open in its outer circumferential surface at respective circumferentional portions outside the locations of the aforementioned first through hole 56 and the housing recess 60, each extending a predetermined circumferential length. The formation of the lightening recesses 66 reduces the thickness of the circumferential wall of the lower recess 50, thus reducing the overall weight of the partition member 34. In the present embodiment, as the first through hole 56 and the housing recess 60 are formed at proximate locations on the circumference of the annular projection 36, a total of four lightening recesses 66 are formed in an area covering slightly less than ¾ of the circumference, excluding the locations where the first through hole 56 and the housing recess 60 are formed. These lightening recesses 66 are configured in consideration of mold opening and closing conditions when molding the partition member 34 with a mold parting in a direction corresponding to a depthwise direction of the housing recess 60, which is orthogonal to an axial direction of the partition member 34.

By forming the lightening recesses 66, the two axial side edges of the annular projection 36 respectively take the form of thin-wall portions 68, 70 each extending with a thin plate shape in the circumferential direction of the annular projection 36. These thin-wall portions 68, 70 constitute one of the lateral sidewalls of the first and second circumferential grooves 38, 40, respectively. The first and second circumferential grooves 38, 40 have lateral sidewalls of mutually different height, respectively, with the axially inward sidewalls (consisting of the thin-wall portions 68, 70 of the annular projection 36) being higher than the axially inward outward sidewalls of the partition member 34.

The thin-wall portions 68, 70 constituting the axially inward sidewalls in the first and second circumferential grooves 38, 40 are respectively provided with notches 72, 74 at two locations on their circumferences. Preferably, dimensions of the notches 72, 74 in the circumferential direction are held within a range of about 0.5 mm–20 mm, and more preferably about 1.0 mm–15 mm. If the circumferential dimension of notches 72, 74 is too small, it becomes difficult to achieve satisfactory discharge efficiency of residual liquid, which will be described later, whereas if conversely this dimension is too large, there may be a loss of fluid-tightness in the fluid-filled zone, which will be also described later. In the present embodiment, the two notches 72, 74 are disposed at respective circumferential locations opposed to each other in a diametric direction orthogonal to an axis of the partition member 34. Each notch 72 extends across substantially the entire opening of the housing recess 60 at the location where the housing recess is formed. In the present embodiment, the notches 72, 74 open in the mold closing/opening direction during molding of the partition member 34, and therefore do not pose problems in mold closing/opening during molding of the partition member 34.

Each of the notches 72, 74 has a depth so as to substantially reach the floor of the first and second circumferential grooves 38, 40. For this arrangement, the floors of the first and second circumferential grooves 38, 40 are connected to the housing recess 60 through one set of notches 72, 72, and the floors of the first and second circumferential grooves 38, 40 are connected to lightening recesses 66 through the other set of notches 74, 74.

As shown in FIG. 1, the partition member 34 has assembled with a rubber elastic plate 76 and a metal septum 78. The rubber elastic plate 76 is of approximate disk shape of predetermined thickness, and is integrated with a metal sleeve 80 bonded on its outer circumferential surface through a vulcanization process of a rubber material for forming the rubber elastic plate 76. The metal sleeve 80 has a thin-walled cylindrical shape with an annular inward projection 82 integrally formed at the edge of the opening on the axial lower end thereof.

Figure 7:
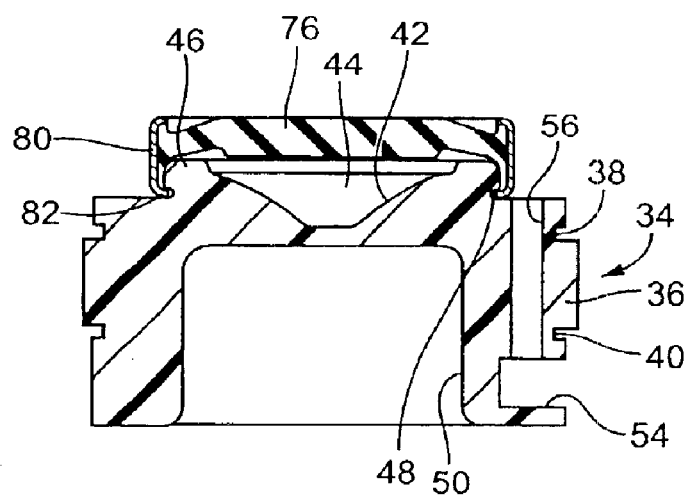
FIG. 7 is a cross sectional view taken along line 7—7 of FIG. 6.

Referring now to FIG. 7, the metal sleeve 80 is disposed radially outwardly on the support projection 46 of the partition member 34 and subjected to a diameter reducing process by means of multidirectional drawing, so that the inward projection 82 is brought into engagement with the engaging groove d at the basal end of the support projection 46. As a result, the metal sleeve 80 is firmly fixed onto the support projection 46 of the partition member 34. In this state, the opening of the upper recess 42 of the partition member 34 is fluid-tightly closed by the rubber elastic plate 76, thereby forming a sealed working air chamber 44 partially defined by the rubber elastic plate 76. The upper and lower surfaces of the rubber elastic plate 76 are unconstrained, being positioned away from other parts, thereby permitting elastic deformation in a thickness direction of the plate (i.e., vertical direction as seen in FIG. 1). When the engine mount 10 is installed in position, an external air conduit is connected to the port 62 of the partition member 34, whereby fluctuations or variation in air pressure provided from a pressure control member (not shown) are exerted on the working air chamber 44 via an air passage 84 leading from the air conduit.

Figure 8:
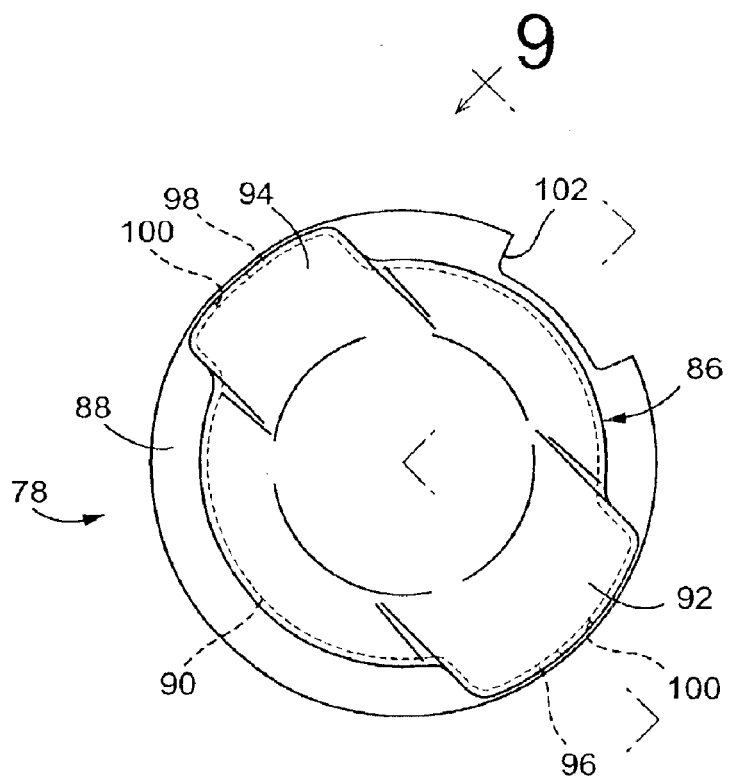
FIG. 8 is a top plane view of a septum of the engine mount of FIG. 1.
Figure 9:
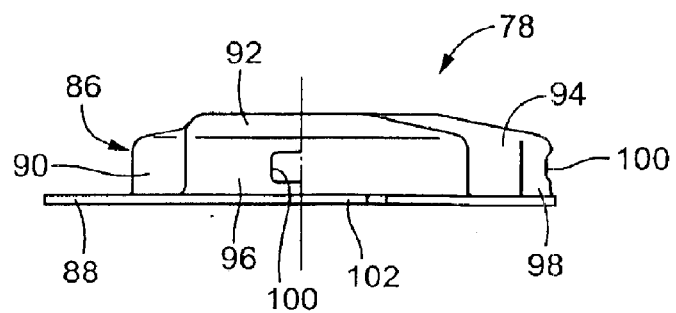
FIG. 9 a side elevation viewed in directions indicated by arrows 9—9 of FIG. 8.
Figure 10:
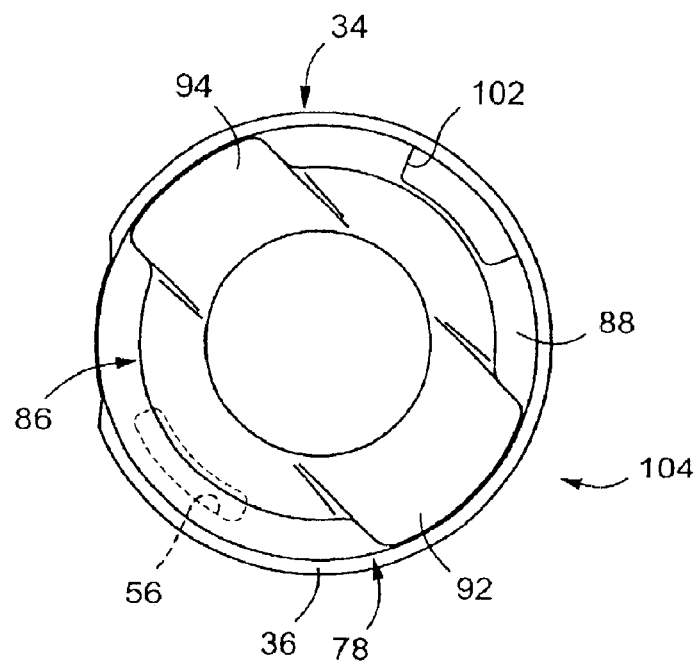
FIG. 10 is a top plane view of an assembly of the engine mount of FIG. 1, consisting of the partition member, an elastic body and the septum.

Referring now to FIGS. 8–10, the metal septum 78 has an approximate hat shape overall, and includes a shallow-bottomed inverted cup portion 86 formed in its central portion and a flange portion 88 integrally formed at and spreading radially outwardly from a rim of the opening of the inverted cup portion 86. A peripheral wall 90 of the metal septum 78 has enlarged diameter over a predetermined circumferential width at two diametrically opposite locations thereof, thereby integrally forming a pair of diametric projections 92, 94 that project diametrically outward with the predetermined circumferential width. The diametric projections 92, 94 have diametric dimensions extending substantially to an outer peripheral portion of the flange portion 88. The diametric projections 92, 94 are also formed therein air bleed hole 100, respectively, perforating them in the diametric direction, located in diametric projecting distal end portions 96, 98 produced by diametrically projecting portions of the peripheral wall 90. The flange portion e metal septum 78 has a cutout 102 formed in a circumferentially intermediate portion thereof on one circumferential side connecting the pair of diametric projections 92, 94. This cutout 102 functions as a hole for communicating with a pressure-receiving chamber 116, which will be described later.

Figure 11:
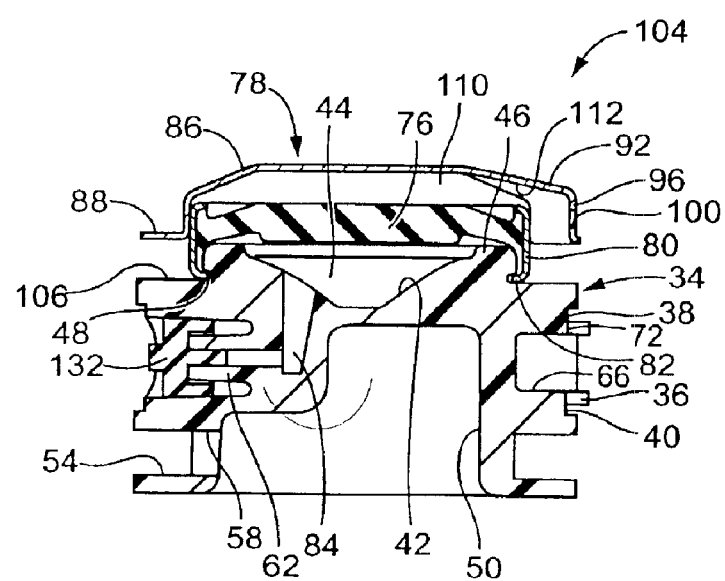
FIG. 11 is an elevational view in axial or vertical cross section of the assembly of FIG. 10.

As shown in FIGS. 1 and 11, the opening of the inverted cup portion 86 of the metal septum forcedly press-fitted from axially above onto the metal sleeve 80 assembled with the partition member 34, whereby the metal septum 78 is fixedly assembled with the metal sleeve 80. As a result, there is formed an integral assembly 104 composed of the partition member 34, the rubber elastic plate 76 with the metal sleeve 80 and the metal septum 78.

In this integral assembly 104, the flange portion e metal septum 78 diametrically outward from the metal sleeve 80, so that the flange portion 88 is axially opposed to and cooperates with the upper surface of the partition member 34 to define therebetween an annular groove 106 continuously extending in the circumferential direction on the outer circumferential surface of the metal sleeve 80. The metal septum 78 is positioned relative to the partition member 34 in the circumferential direction such that the cutout 102 in the flange portion of is positioned diametrically opposite from the first through hole 56 formed in the partition member 34, so that a line drawn across the diameter between the opposed locations of cutout 102 and the first through hole 56 intersects at substantially right angles a line drawn across the diameter between the opposed locations of the diametric projections 92, 94 of the metal septum 78.

The opening in the inverted cup portion 86 of the metal septum 78 is fluid-tightly covered or closed by the rubber elastic plate 76, forming therebetween an airspace 110 for providing an auxiliary fluid chamber 108, which will be described later. In this regards, the metal septum 78 is spaced apart from the metal sleeve 80 at the pair of diametric projections 92, 94, to thereby define therebetween a pair of communication holes 112, 112 for fluid communication between the annular groove 106 and the airspace 110.

That is, the annular groove 106 formed on the outer circumferential surface of the metal sleeve 80 is open at one circumferential location onto the upper surface of the metal septum he cutout 102, and at locations branching to either circumferential side thereof, each extending in the circumferential direction a distance equal to about ¼ of the circumference of the metal septum 78, communicates with the airspace 110 via the holes 112, 112. Past the holes 112, 112 communicating with the auxiliary fluid chamber 108, the flow converges at locations extending approximately half the circumference to either circumferential side from the cutout 102, and connects to the outer circumferential groove 54 via the first through hole 56.

The integral vulcanized product of the elastic body 16 is then attached from above in the axial direction to the integral assembly 104 having the structure as described above. Assembly may be carried out by fitting the second mounting member 14 onto the partition member 34 from above in the axial direction, and subjecting the second mounting member 14 to a diameter reducing process by means of multidirectional drawing or the like with the engaging projection e second mounting member 14 positioned in abutment with the axial upper surface of the annular projection 36. As a result, the opening of the small-diameter portion 26 of the second mounting member 14 is secured fitting onto the outside of the upper end portion of the partition member 34, with the engaging projection 28 provided to the small-diameter portion 26 of the second mounting member 14 firmly fitted into the first circumferential groove 38 formed above the annular projection 36.

With the integral vulcanized product of the elastic body 16 assembled with the integral assembly 104 as described above, an inner circumferential surface of the opening portion at the small-diameter portion 26 of the second mounting member 14 is placed in abutment against the outer circumferential surface of the partition member 34 with the sealing rubber layer 32 interposed therebetween, so that the opening at the small-diameter portion 26 of the second mounting member 14 is fluid-tightly closed by the partition member 34. Further, the drawing operation performed on the second mounting member 14 ensures that an outer circumferential edge of the flange portion 88 of the metal septum 78 is placed in fluid-tight abutment in the diametric direction with respect to the small-diameter portion 26 of the second mounting member 14, with the annular groove 106 formed in the assembly 104 covered by the small-diameter portion 26 to form an annular passage 114. Additionally, the diametrically projecting distal end portions 96, 98 of the diametric projections 92, 94 abut the small-diameter portion 26 of the second mounting member 14, with the air bleed holes 100, 100 formed in the projecting distal end portions 96, 98 are provided with fluid-tight closure.

By assembling the assembly 104 with the second mounting member 14, the metal septum 78 is situated so as to partition the space between the opposing surfaces of the elastic body 16 and the rubber elastic plate 76 into two chambers, namely, the pressure-receiving chamber partially defined by the elastic body 16 and the auxiliary fluid chamber 108 partially defined by the rubber elastic plate 76. A pressure of the fluid in the pressure-receiving chamber 116 varies upon application of vibrations due to the elastic deformation of the elastic body. A pressure of the fluid in the auxiliary fluid chamber 108, on the other hand, can be regulated by adjusting a spring stiffness of the rubber elastic plate 76 or alternatively by deforming the rubber elastic plate 76 in oscillating manner, both through suitable pressure control of the working air chamber 44.

Below the partition member 34 is disposed a diaphragm 118 serving as a flexible rubber layer. The diaphragm 118 is a thin rubber film of overall thin disk shape having a suitable amount of slack. The outer peripheral edge of the diaphragm 118 is bonded through vulcanization to a hollow cylindrical fitting 120 serving as a hollow cylindrical support fitting in the second sealing member. The hollow cylindrical fitting 120 has an overall shape of a large-diameter round cylinder, and includes an engaging projection 122 integrally formed at the edge of the upper opening in the axial direction thereof. This engaging projection 122, serving as a second annular fixing projection, is bent diametrically inward and projects out slightly with an annular shape continuously extending in its circumferential direction. Like the second mounting member 14 as described above, the engaging projection 122 can be advantageously manufactured by pressing. The outer peripheral portion of the diaphragm 118 is bonded through vulcanization to the opening at the axially lower end of the hollow cylindrical fitting 120, providing fluid-tight closure to the opening at the axially lower end of the hollow cylindrical fitting 120. As is apparent from the preceding, the diaphragm 118 takes the form of an integral vulcanized product including the hollow cylindrical fitting 120. An inner circumferential surface of the hollow cylindrical fitting 120 is coated in its entirety by a sealing rubber layer 124 integrally formed with the diaphragm 118.

With the hollow cylindrical fitting 120 fitted externally about the partition member 34 from below in the axial direction, and the engaging projection 122 of the hollowing cylindrical fitting 120 positioned in abutment with the axial lower surface of the annular projection 36, the diameter of the hollow cylindrical fitting 120 is subjected to a diameter reducing process by means of multidirectional drawing or the like. As a result, the upper opening of the hollow cylindrical fitting 120 is firmly fitted onto the outer circumferential surface at the lower end portion of the partition member 34 with the sealing rubber layer 124 interposed therebetween, with the engaging projection 122 provided in the hollow cylindrical fitting 120 secured fitted within the second circumferential groove 40 formed below the annular projection 36. In this state, the opening of the lower recess 50 of the partition member 34 is provided with a fluid-tight closure by the diaphragm 118. The diameter reducing process for the second mounting member 14 and the same for the hollow cylindrical fitting 120 may be performed simultaneously.

By attaching the diaphragm 118 to the partition member 34 so as to close the lower recess 50 in fluid-tight fashion, there is formed in the space between the partition member 34 and the diaphragm 118 an equilibrium chamber 52 partially defined by the diaphragm 118, which readily allows change in volume with deformation of the diaphragm 118, so as to quickly cancel or absorb fluid pressure variation. The opening of the outer circumferential groove 54 formed on the partition member 34 is also closed in fluid-tight fashion by the hollow cylindrical fitting 120, thus forming an outer circumferential passage 126 extending in the circumferential direction by a predetermined length.

The pressure-receiving chamber 116, the auxiliary fluid chamber 108 and the equilibrium chamber 52 formed in the manner described above are filled with non-compressible fluid, and cooperate together to provide a fluid-filled zone. Water, alkylene glycol, polyalkylene glycol, silicone oil or similar materials may be employed as sealed fluid. Low viscosity fluid having viscosity of not larger than 0.1 Pa·s is favorable for use, as such fluid provides advantages in vibration damping based on resonance of the fluid flowing through the orifice passages, which will be described later. The pressure-receiving chamber 116 is held in fluid communication with the equilibrium chamber 52 and the auxiliary fluid chamber 108 respectively through a first orifice passage 128 second orifice passage 130 configured using the annular passage 114.

In this regards, the first orifice passage 128 the form of a fluid passage bifurcating the annular passage 114 in the circumferential direction from the cutout 102 open to the pressure-receiving chamber 116. The branches of the annular passage 114 circumferentially extend in juxtaposition over a distance equal to about a half of the circumference of the annular passage so as to reach the outer circumferential passage 126 via the first through hole 56, and then reach the equilibrium chamber 52 via the second through hole 58. The second orifice passage 128, on the other hand, takes the form of a fluid flow passage bifurcating the annular passage 114 in the circumferential direction from the cutout 102 that opens into the pressure-receiving chamber 116. The branches extends over a distance equal to about one-fourth of the circumference of the annular passage so as to reach the auxiliary fluid chamber 116 communication holes 112, 112. In the present embodiment, the first orifice passage 1he second orifice passage 130 can be formed by means of a simple structure with a small number of parts, utilizing the metal sleeve used to assemble the rubber elastic plate 76 to the partition member 34, and the metal septum to form the auxiliary fluid chamber 108. In the present embodiment, the first orifice passage 128 is made larger in length than the second orifice passage 130, and tuned to a relatively lower frequency band.

Filling and sealing non-compressible fluid in the pressure-receiving chamber 116, the auxiliary fluid chamber 108, and the equilibrium chamber 52 is advantageously accomplished by assembling the second mounting member 14 and the hollow cylindrical fitting 120 onto the integral assembly 104 while immersed in non-compressible fluid.

Described in detail, as shown in FIG. 7, for example, the metal sleeve 80 with the rubber elastic plate 76 bonded by vulcanization thereto is assembled with the partition member 34 in the atmosphere, then, as shown in FIG. 11, the separately fabricated metal septum 78 is firmly fitted onto the outer circumferential surface of the metal sleeve 80, to thereby produce the integral assembly 104. A rubber plug 132 (see FIG. 11) is then inserted into the port 62 of the partition member 34 in the integral assembly 104 to plug in fluid-tight fashion of the working air chamber 44 and the air passage 84 opening. The integral assembly is then immersed in a mass of a non-compressible fluid. Optionally, the integral assembly 104 may be tilted or rotated in the non-compressible fluid so that the non-compressible fluid pervades it without any residual air in the lower recess 50, the outer circumferential groove 54, the airspace 110, the annular groove 106, etc.

Since the airspace 110 of substantially fluid-tight structure in assembly 104 is open to the annular groove 106 via the communication holes 112, 112 formed in the diametric projections 92, 94, and the projecting distal end portions 96, 98 of the pair of the diametric projections 92, 94 are perforated by air bleed holes 100, 100 through which the airspace 110 is held in direct communication with the outside, the airspace 110 can be filled with the non-compressible fluid relatively easily. During assembly within the mass of the non-compressible fluid, it may be executable to jet non-compressible fluid from a nozzle or the like and inject the fluid into the airspace 110 through one of the air bleed holes 100, making it possible to rapidly expel residual air from the other air bleed hole 100.

Once operation for expelling residual air from the integral assembly 104 has been completed, the integral vulcanized products of the elastic body 16 and the diaphragm 118 are immersed in the mass of the non-compressible fluid. Working under non-compressible fluid, the second mounting member 14 bonded by vulcanization to the elastic body 16 and the hollow cylindrical fitting 120 bonded by vulcanization to the diaphragm 118 are fitting onto the outer circumferential surface of the integral assembly 104 from both axial ends of the assembly 104, and subjected to drawing. As a result, the engaging projection 28 of the second mounting member 14 and the engaging projection 122 of the hollow cylindrical fitting 120 are inserted and firmly engaged within the first and second circumferential grooves 38, 40 of the partition member 34. In this way, both integrally vulcanized products of the elastic body 16 and the diaphragm 118 are secured fitting to the partition member 34, thus forming the pressure-receiving chamber 116, the auxiliary fluid chamber 108, and the first and second orifice passages 128, 130, while at the same time filling and sealing non-compressible fluid therein.

The engine mount 10 assembled under non-compressible fluid in the manner described above is then removed from the non-compressible fluid, and washed to remove any non-compressible fluid remaining on its surfaces. Washing may be accomplished, for example, by spraying the entire surface of engine mount 10 with cold or hot water under ambient air. Then, using a spray gun or the like, compressed air is jetted onto the entire surface of the engine mount 10 to dry it, at which point the engine mount 10 is ready for product shipment.

In the engine mount 10 having the construction described hereinabove, the outer circumferential surface of the support projection 46 of the partition member 34 is exposed to the outside at an axial location interposed between the second mounting member 14 and the hollow cylindrical fitting 120, with the notches 72, 72, 74, 74 formed in the support projection 46 lying open on this exposed surface. That is, the first and second circumferential grooves 38, 40 communicate with the outside air through these notches 72, 74, forming a drain passage.

During the drying process mentioned above, the compressed air jetted onto the surface of the engine mount 10 becomes blown into the openings of the notches 72, 74 during the normal drying process, or compressed air is aimed at and blown into the openings of the notches 72, 74. Compressed air blown in through one of the notches 72, 74 enters the first and second circumferential grooves 38, 40, which are covered by the engaging projection e second mounting member 14 and the engaging projection 122 of the hollow cylindrical fitting 120, passes through the first and second circumferential grooves 38, 40 in the circumferential direction, and is then expelled to the outside air through the other of the notches 72, 74.

In this way, non-compressible fluid, which has filled the first and second circumferential grooves 38, 40 in the course of assembly while immersed in non-compressible fluid and which has been sealed as residual liquid in the first and second circumferential grooves 38, 40 by the engaging projections 28, 122 of the second mounting member 14 and the hollow cylindrical fitting 120, is forcedly expelled or discharged from the first and second circumferential grooves 38, 40 so as to be pushed along with the flow of compressed air, so that residual non-compressible fluid may be quickly eliminated from the first and second circumferential grooves 38, 40.

In an engine mount 10 of the structure described above, constructed in this manner, when exposed to low frequency vibrations, e.g., engine shakes, the engine mount 10 is able to exhibit high vibration damping effect based on resonance of non-compressible fluid flowing through the first orifice passage, which is caused by passively produced relative pressure variation or fluctuations between the pressure-receiving chamber 116 and the equilibrium chamber 52. On the other hand, when exposed to high frequency vibrations, e.g., engine idling vibrations, the engine mount 10 is capable of exhibit active damping effect in the following manner. Namely, the working air chamber 44 is subjected from the outside to air pressure variation in a frequency corresponding to the engine idling vibrations, thereby oscillating the rubber elastic plate 76 at a frequency corresponding to the engine idling vibrations. The internal pressure variation in auxiliary fluid chamber 108 produced thereby are exerted on the pressure-receiving chamber 116 via the second orifice passage 130, whereby the pressure variation in the pressure-receiving chamber can be actively or positively controlled, thus accomplishing intended active damping effect.

In the engine mount 10 of the present embodiment, the second mounting member 14 bonded by vulcanization to the elastic body 16 and the hollow cylindrical fitting 120 bonded by vulcanization to the diaphragm 118 are both secured fitting directed onto the partition member 34 through a fixing engagement of the engaging projections 28, 122 to the first and second circumferential grooves 38, 40 formed on the partition member 34. This makes it possible to form the pressure-receiving chamber 116, the auxiliary fluid chamber 108 and the equilibrium chamber 52 with a reduced number of components, by effectively utilizing the partition member 34.

Additionally, residual non-compressible fluid entering the first and second circumferential grooves 38, 40 of the partition member 34 during production can be expelled in efficient manner, by advantageously utilizing the jet of compressed air employed in the product drying process. This makes it possible to effectively avoid the problem of so-called "false leakage", providing the engine mount 10 with a high level of reliability.

In the engine mount 10 of the present embodiment, the first and second circumferential grooves 38, 40 in partition member 34 are formed a predetermined distance apart in the axial direction, whereby a housing recess 60 for housing the port 62 can be formed easily, so as to open directly in the outer circumference surface of the annular projection 36 which is exposed to the outside between the first and second circumferential grooves 38, 40.

In the preceding description, described was application of the present invention in a production process involving-assembly of the engine mount 10 while immersed in non-compressible fluid, washing, and then drying with a jet of compressed air, but it would be possible to employ a vacuum drying process rather than compressed air drying. As a specific example, after assembling the engine mount 10 while immersed in non-compressible fluid and washing it in the manner described above, the engine mount 10 is placed in a chamber of a vacuum vessel and subjected to vacuum pressure to vaporize washing solution and the like adhering to the surface of the engine mount 10, to effect drying. During this process, since vacuum pressure reaches also to the floors of the first and second circumferential grooves 38, 40 via the openings of the notches 72, 74 to the outside, drying is carried out in an effective manner, and non-compressible fluid and the like remaining in the first and second circumferential grooves 38, 40 can be quickly eliminated.

While the presently preferred embodiment of this invention has been described in detail for illustrative purpose only, it is to be understood that the present invention is not limited to the details of the illustrated embodiments, but may be embodied with various changes, modifications and improvements, which may occur to those skilled in the art, without departing from the spirit and scope of the invention defined in the following claims.

For example, in the illustrated embodiment, pressure in the auxiliary fluid chamber 108 actively controlled via fluctuations in air pressure, corresponding to the vibration frequency to be damped, which are exerted on the working air chamber 44 formed behind the rubber elastic plate 76. However, some other arrangement could be employed, for example, modifying the static air pressure value in the working air chamber 44 depending on the vibration frequency to be damped, in order to regulate the spring rigidity of the rubber elastic plate 76, thereby modifying the tuning frequency of the passive damping action produced on the basis of resonance of the fluid caused to flow through the second orifice passage 130.

Alternatively, it would be possible to employ an approximately cylindrical overall configuration for the partition member 34 without providing a floor to the upper recess 42 in the partition member 34, and to form the equilibrium chamber 52 between the rubber elastic plate 76 and the diaphragm 118 without providing the working air chamber 44. In an engine mount of this design, the auxiliary fluid chamber 108 and the equilibrium chamber 52 are formed to either side of a partition member 34 that includes the rubber elastic plate 76 as an element thereof. With the help of the difference in spring stiffness between the rubber elastic plate 76 partially defining the auxiliary fluid chamber 108 and the diaphragm 118 partially defining the equilibrium chamber 52, the engine mount of this design is able to exhibit passive vibration isolating/damping effect with respect to vibrations in different frequency ranges based on resonance of fluid flowing through the first and second orifice passages 128, 130, respectively.

In the illustrated embodiment, two circumferential grooves 38, 40 are formed in the partition member 34 as annular fixing recesses, and engaging projections 28, 122 provided as annular engaging projections to the first mounting member 14 and the hollow cylindrical fitting 120 are secured fitted therein. However, the fitted securing structure according to the invention could be employed for either the second mounting member 14 and hollow cylindrical fitting 120, while employing some other securing structure, such as pressure fitting, for the other.

Specific structure of the fluid-filled zone and orifice passages formed there can be established and modified appropriately with reference to the frequency being damped and other factors, and are not limited in any way.

In the illustrated first and second embodiments, application of the present invention in an engine mount for vehicles is given by way of example, but the principle of the present invention is equally applicable to vibration damping devices or apparatuses for use in various kinds of vibrative components which require damping of their vibration.

What is claimed is:

1. A method of manufacturing a fluid-filled vibration-damping device comprising the steps of:

connecting a first mounting member and a second mounting member via an elastic body;

providing a fluid-filled zone partially defined by said elastic body and filled with non-compressible fluid;

preparing at least one sealing part of said fluid-filled zone by fitting a first sealing member of cylindrical configuration externally about a second sealing member with said first and second sealing members fluid-tightly fixed to each other by fitting a first annular fixing projection formed on one of an inner circumferential surface of said first sealing member and an outer circumferential surface of said second mounting member into a first annular fixing recess formed onto an other one of said inner circumferential surface of said first sealing member and said outer circumferential surface of said second mounting member;

forming a plurality of drain passages at respective circumferential locations on said first annular fixing recess in order to expose a floor of said first annular fixing recess to an outside, and said plurality of drain passages are remotely located from said sealing part; and blowing compressed air in through at least one of said plurality of drain passages so as to forcedly discharge said non-compressible fluid remained on said floor of said first annular fixing recess to said outside.

2. A method of manufacturing a fluid-filled vibration-damping device according to claim 1, further comprising the steps of: arranging said first annular fixing recess of one of said first and second sealing members to have lateral sidewalls having different heights; and when fitting said first sealing member externally about said second sealing member, positioning said first and second sealing members relative to each other in a direction in which said first sealing member is inserted onto said second sealing member by means of an abutting contact of one of axially opposite ends of the other of said first and second sealing members with a higher one of said lateral sidewalls.

3. A method of manufacturing a fluid-filled vibration-damping device according to claim 1, further comprising the steps of: arranging said first annular fixing recess of one of said first and second sealing members to have lateral sidewalls one of which includes a thin-walled portion at least one circumferential position thereof, and forming a plurality of notches in said thin-walled portion so as to provide said drain passages.

4. A method of manufacturing a fluid-filled vibration-damping device according to claim 1, further comprising the steps of: bending radially inwardly one of axially opposite end portions of said first sealing member to form said first annular fixing projection; shaping said second sealing member a block-like member having an cylindrical outer circumferential surface; forming said first annular fixing recess onto said outer circumferential surface of said second sealing member; and after disposing said first sealing member on said second sealing member, performing a diameter reducing process on said first sealing member to press-fitting said first annular fixing projection into said first annular fixing recess so that said first and second sealing member fixedly assembled together.

5. A method of manufacturing a fluid-filled vibration-damping device according to claim 1, further comprising the step of fitting said first sealing member externally about the second sealing member within a mass of said non-compressible fluid.

6. A method of manufacturing a fluid-filled vibration-damping device comprising the steps of:

connecting a first mounting member and a second mounting member via an elastic body;

providing a fluid-filled zone partially defined by said elastic body and filled with non-compressible fluid;

preparing at least one sealing part of said fluid-filled zone by fitting a first sealing member of cylindrical configuration externally about a second sealing member with said first and second sealing members fluid-tightly fixed to each other by fitting a first annular fixing projection formed on one of an inner circumferential surface of said first sealing member and an outer circumferential surface of said second mounting member into a first annular fixing recess formed onto an other one of said inner circumferential surface of said first sealing member and said outer circumferential surface of said second mounting member;

forming a plurality of drain passages at respective circumferential locations on said first annular fixing recess in order to expose a floor of said first annular fixing recess to an outside, and said plurality of drain passages are remotely located from said sealing part; and after filling and sealing said fluid-filled zone with said non-compressible fluid, placing said device within a vacuum vessel so as to forcedly discharge said non-compressible fluid remained on said floor of said first annular fixing recess to said outside.

7. A method of manufacturing a fluid-filled vibration-damping device according to claim 6, further comprising the steps of: arranging said first annular fixing recess of one of said first and second sealing members to have lateral sidewalls having different heights; and when fitting said first sealing member externally about said second sealing member, positioning said first and second sealing members relative to each other in a direction in which said first sealing member is inserted onto said second sealing member by means of an abutting contact of one of axially opposite ends of the other of said first and second sealing members with a higher one of said lateral sidewalls.

8. A method of manufacturing a fluid-filled vibration-damping device according to claim 6, further comprising the steps of: arranging said first annular fixing recess of one of said first and second sealing members to have lateral sidewalls one of which includes a thin-walled portion at least one circumferential position thereof, and forming a plurality of notches in said thin-walled portion so as to provide said drain passages.

9. A method of manufacturing a fluid-filled vibration-damping device according to claim 6, further comprising the steps of: bending radially inwardly one of axially opposite end portions of said first sealing member to form said first annular fixing projection; shaping said second sealing member a block-like member having an cylindrical outer circumferential surface; forming said first annular fixing recess onto said outer circumferential surface of said second sealing member; and after disposing said first sealing member on said second sealing member, performing a diameter reducing process on said first sealing member to press-fitting said first annular fixing projection into said first annular fixing recess so that said first and second sealing member fixedly assembled together.

10. A method of manufacturing a fluid-filled vibration-damping device according to claim 6, further comprising the step of fitting said first sealing member externally about the second sealing member within a mass of said non-compressible fluid.

11. A fluid-filled vibration-damping device comprising:

a first mounting member;

a second mounting member;

an elastic body elastically connecting said first and second mounting members;

a fluid-filled zone partially defined by said elastic body and filled with non-compressible fluid;

a first sealing member and a second sealing member which cooperate to constitute at least one sealing part of said fluid-filled zone, said first sealing member being of cylindrical configuration, having a first annular fixing projection formed by bending radially inwardly one of axially opposite end portions thereof, and being fitted into a first annular fixing recess formed onto an outer circumferential surface of said second sealing member so that said first and second sealing members are fluid-tightly fixed together; and a plurality of drain passages formed at respective circumferential locations on said first annular fixing recess and open in an outer circumferential surface of said device in order to expose a floor of said first annular fixing recess to an outside, and said plurality of drain passages are remotely located from said sealing part;

wherein said non-compressible fluid remained on said floor of said first annular fixing recess is able to be forcedly discharged to the outside through the drain passages by means of compressed air blown in through at least one of said drain passages, and wherein said first sealing member is constituted by said second mounting member of cylindrical configuration, said second mounting member being opposed at one axial open-end portion thereof to said first mounting member with a spacing therebetween so that said one axial open-end portion of said second mounting member is fluid-tightly closed by said elastic body connecting said first and second mounting members, and at an other axial open-end portion thereof to be bent radially inwardly to provide said first annular fixing projection, wherein said second sealing member is constituted by a block shaped partition member made of rigid material having a cylindrical outer circumferential surface, and said first annular fixing recess is formed onto an outer circumferential surface of said partition member, and wherein said other axial open-end portion of said second mounting member is fitted externally about said partition member on one axial side of said partition member, and said first annular fixing projection formed on said other axial open-end portion of said second mounting member is press-fitted into said first annular fixing recess open in said outer circumferential surface of said partition member so that said elastic body and said partition member cooperate to form therebetween a pressure-receiving chamber providing said fluid-filled zone.

12. A fluid-filled vibration-damping device according to claim 11, further comprising a cylindrical support member and a flexible rubber layer bonded at an outer circumferential portion thereof to an inner circumferential surface of said cylindrical support member so as to fluid-tightly close one axial open end of said cylindrical support member, wherein a second annular fixing projection is formed at an other axial open end of said cylindrical support member, and a second annular fixing recess is formed onto said outer circumferential surface of said partition member to be independent of and parallel to said first annular fixing recess to be engaged with the first annular fixing projection of the second mounting member, and wherein said cylindrical support member is fitted externally about said partition member on an other axial side of said partition member, and said second annular fixing projection formed at said cylindrical support member is press fitted into said second annular fixing recess open in said outer circumferential surface of said partition member so that said flexible rubber layer and said partition member cooperate to form therebetween an equilibrium chamber providing said fluid-filled zone.

13. A fluid-filled vibration-damping device according to claim 12, wherein said partition member includes an annular projection integrally formed at an axially intermediate portion thereof with an diameter larger than an axially opposite end thereof, wherein said first and second annular fixing recesses open in an outer circumferential surface of said annular projection at an axially opposite end portions of said annular projections so that said outer circumferential surface of said annular projection is exposed to said outside at an axially intermediate portion thereof located between said first and second annular fixing recesses in which said plurality of drain passages are open at respective circumferential locations.

14. A fluid-filled vibration-damping device according to claim 13, wherein annular projections has a plurality of lightening recesses open in said outer circumferential surface thereof at a location interposed between said first and second annular fixing recesses, thereby forming a plurality of thin-walled portions in which a plurality of notches are formed in order to expose said floor of said first and second annular fixing recess to said outside through said notches.

15. A method of manufacturing a fluid-filled vibration-damping device comprising the steps of:
    connecting a first mounting member and a second mounting member via an elastic body;
    providing a fluid-filled zone partially defined by said elastic body and filled with non-compressible fluid;
    preparing at least one sealing part of said fluid-filled zone by fitting a cylindrical first sealing member externally about a second sealing member having an outer circumferential surface with said first and second sealing members fluid-tightly fixed to each other by fitting a first annular fixing projection formed by bending radially inwardly one of axially opposite end portions of said first sealing member into a first annular fixing recess formed onto said outer circumferential surface of said second mounting member;
    after disposing said first sealing member on said second sealing member, performing a diameter reducing process on said first sealing member to press-fitting said first annular fixing projection into said first annular fixing recess so that said first and second sealing member fixedly assembled together with a floor of said first annular fixing recess slightly spaced away from an interface between said first annular fixing recess and projections;
    forming a plurality of drain passages at respective circumferential locations on said floor of said first annular fixing recess with a shape open in said outer circumferential surface of said second sealing member and extending axially downwardly from said floor of said first annular fixing recess so that said floor of said first annular fixing recess is exposed to an outside through said drain passages; and said plurality of drain passages are remotely located from said sealing part; and
    blowing compressed air in through at least one of said plurality of drain passages so as to forcedly discharge said non-compressible fluid remained on said floor of said first annular fixing recess to said outside.

16. A method of manufacturing a fluid-filled vibration-damping device according to claim 15, further comprising the steps of: arranging said first annular fixing recess of said second sealing member to have lateral sidewalls having different heights; and when fitting said first sealing member externally about said second sealing member, positioning said first and second sealing members relative to each other in a direction in which said first sealing member is inserted onto said second sealing member by means of an abutting contact of said axially opposite ends of the first sealing member with a higher one of said lateral sidewalls.

17. A method of manufacturing a fluid-filled vibration-damping device according to claim 15, further comprising the steps of: arranging said first annular fixing recess of said second sealing member to have lateral sidewalls one of which includes a thin-walled portion at least one circumferential position thereof, and forming a plurality of notches in said thin-walled portion so as to provide said drain passages.

18. A method of manufacturing a fluid-filled vibration-damping device according to claim 15, further comprising the step of fitting said first sealing member externally about the second sealing member within a mass of said non-compressible fluid.

19. A method of manufacturing a fluid-filled vibration-damping device comprising the steps of:
    connecting a first mounting member and a second mounting member via an elastic body;
    providing a fluid-filled zone partially defined by said elastic body and filled with non-compressible fluid;
    preparing at least one sealing part of said fluid-filled zone by fitting a cylindrical first sealing member externally about a second sealing member having an outer circumferential surface with said first and second sealing members fluid-tightly fixed to each other by fitting a first annular fixing projection formed by bending radially inwardly one of axially opposite end portions of said first sealing member into a first annular fixing recess formed Onto said outer circumferential surface of said second mounting member;
    after disposing said first sealing member on said second sealing member, performing a diameter reducing process on said first sealing member to press-fitting said first annular fixing projection into said first annular fixing recess so that said first and second sealing member fixedly assembled together with a floor of said first annular fixing recess slightly spaced away from an interface between said first annular fixing recess and projections;
    forming a plurality of drain passages at respective circumferential locations on said floor of said first annular fixing recess with a shape open in said outer circumferential surface of said second sealing member and extending axially downwardly from said floor of said first annular fixing recess so that said floor of said first annular fixing recess is exposed to an outside through said drain passages; and said plurality of drain passages are remotely located from said sealing part; and
    after filling and sealing said fluid-filled zone with said non-compressible fluid, placing said device within a vacuum vessel so as to forcedly discharge said non-compressible fluid remained on said floor of said first annular fixing recess to said outside.

20. A method of manufacturing a fluid-filled vibration-damping device according to claim 19, further comprising the steps of: arranging said first annular fixing recess of said second sealing member to have lateral sidewalls having different heights; and when fitting said first sealing member externally about said second sealing member, positioning said first and second sealing members relative to each other in a direction in which said first sealing member is inserted onto said second sealing member by means of an abutting contact of said axially opposite ends of the first sealing member with a higher one of said lateral sidewalls.

21. A method of manufacturing a fluid-filled vibration-damping device according to claim 19, further comprising the steps of: arranging said first annular fixing recess of said second sealing member to have lateral sidewalls one of which includes a thin-walled portion at least one circumferential position thereof, and forming a plurality of notches in said thin-walled portion so as to provide said drain passages.

22. A method of manufacturing a fluid-filled vibration-damping device according to claim 19, further comprising the step of fitting said first sealing member externally about the second sealing member within a mass of said non-compressible fluid.

23. A fluid-filled vibration-damping device comprising:

a first mounting member;

a second mounting member;

an elastic body elastically connecting said first and second mounting members;

a fluid-filled zone partially defined by said elastic body and filled with non-compressible fluid;

a first sealing member and a second sealing member which cooperate to constitute at least one sealing part of said fluid-filled zone, said first sealing member being of cylindrical configuration, having a first annular fixing projection formed by bending radially inwardly one of axially opposite end portions thereof, and being fitted into a first annular fixing recess formed onto an outer circumferential surface of said second sealing member so that said first and second sealing members are fluid-tightly fixed together with said floor of said first annular fixing recess slightly spaced away from an interface between said first annular fixing recess and projections; and a plurality of drain passages formed at respective circumferential locations on said floor of said first annular fixing recess with a shape open in said outer circumferential surface of said second sealing member and extending axially downwardly from said floor of said first annular fixing recess so that said floor of said first annular fixing recess is exposed to an outside through said drain passages; and said plurality of drain passages are remotely located from said sealing part;

wherein said non-compressible fluid remained on said floor of said first annular fixing recess is able to be forcedly discharged to the outside through the drain passages by means of compressed air blown in through at least one of said drain passages.

24. A fluid-filled vibration-damping device according to claim 23, wherein said plurality of drain passages comprise two drain passages formed at two circumferential locations diametrically opposed to each other.

25. A fluid-filled vibration-damping device according to claim 23, wherein said first sealing member is constituted by said second mounting member of cylindrical configuration, said second mounting member being opposed at one axial open-end portion thereof to said first mounting member with a spacing therebetween so that said one axial open-end portion of said second mounting member is fluid-tightly closed by said elastic body connecting said first and second mounting members, and at an other axial open-end portion thereof to be bent radially inwardly to provide said first annular fixing projection, wherein said second sealing member is constituted by a block shaped partition member made of rigid material and having a cylindrical outer circumferential surface, and said first annular fixing recess is formed unto an outer circumferential surface of said partition member, and wherein said other axial open-end portion of said second mounting member is fitted externally about said partition member on one axial side of said partition member, and said first annular fixing projection formed on said other axial open-end portion of said second mounting member is press-fitted into said first annular fixing recess open in said outer circumferential surface of said partition member so that said elastic body and said partition member cooperate to form therebetween a pressure-receiving chamber providing said fluid-filled zone.

26. A fluid-filled vibration-damping device according to claim 25, further comprising a cylindrical support member and a flexible rubber layer bonded at an outer circumferential portion thereof to an inner circumferential surface of said cylindrical support member so as to fluid-tightly close one axial open end of said cylindrical support member, wherein a second annular fixing projection is formed at an other axial open end of said cylindrical support member, and a second annular fixing recess is formed onto said outer circumferential surface of said partition member to be independent of and parallel to said first annular fixing recess to be engaged with the first annular fixing projection of the second mounting member, and wherein said cylindrical support member is fitted externally about said partition member on an other axial side of said partition member, and said second annular fixing projection formed at said cylindrical support member is press fitted into said second annular fixing recess open in said outer circumferential surface of said partition member so that said flexible rubber layer and said partition member cooperate to form therebetween an equilibrium chamber providing said fluid-filled zone.

27. A fluid-filled vibration-damping device according to claim 26, wherein said partition member includes an annular projection integrally formed at an axially intermediate portion thereof with an diameter larger than an axially opposite end thereof, wherein said first and second annular fixing recesses open in an outer circumferential surface of said annular projection at an axially opposite end portions of said annular projections so that said outer circumferential surface of said annular projection is exposed to said outside at an axially intermediate portion thereof located between said first and second annular fixing recesses in which said plurality of drain passages are open at respective circumferential locations.

28. A fluid-filled vibration-damping device according to claim 27, wherein annular projections has a plurality of lightening recesses open in said outer circumferential surface thereof at a location interposed between said first and second annular fixing recesses, thereby forming a plurality of thin-walled portions in which a plurality of notches are formed in order to expose said floor of said first and second annular fixing recess to said outside through said notches.

* * * * *